Aug. 19, 1969 G. L. ROWELL 3,461,603
WHIRLING-WHISTLING TOYS
Filed Aug. 19, 1966
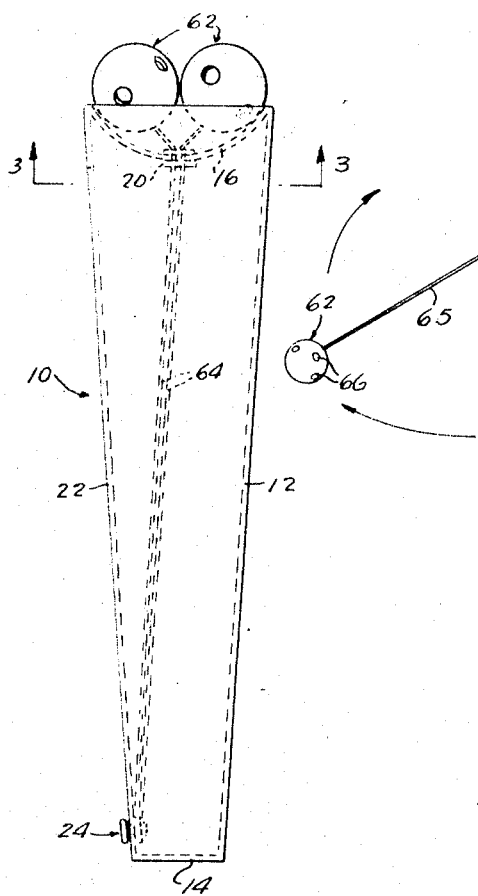
FIG. 1.
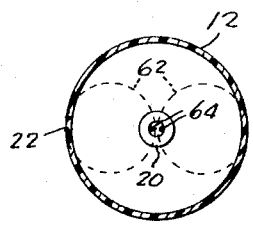
FIG. 2.
FIG. 3.
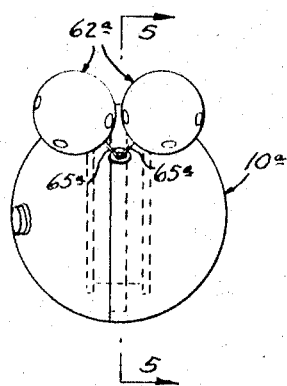
FIG. 4.
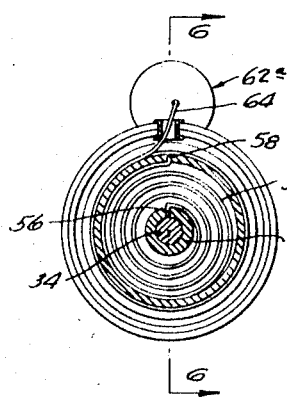
FIG. 5.
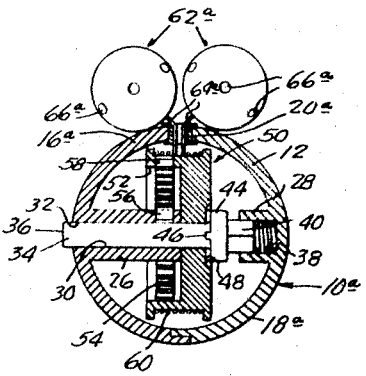
FIG. 6.
INVENTOR.
GAR L. ROWELL,
BY
Berman, Davidson & Berman
ATTORNEYS.

United States Patent Office 3,461,603
Patented Aug. 19, 1969

3,461,603
WHIRLING-WHISTLING TOYS
Gar Lee Rowell, Rte. 1, Box 88, Loris, S.C. 29569
Filed Aug. 19, 1966, Ser. No. 573,528
Int. Cl. A63h 5/00, 33/40
U.S. Cl. 46—52                                          5 Claims

ABSTRACT OF THE DISCLOSURE

A sounding toy consisting of a hollow handle with a concave top wall, a grommet being mounted in a central aperture in said top wall. A cord has two flights extending through the grommet with apertured hollow balls secured to the respective outer ends of the flights. A rigid retracting device is mounted in the handle with the cord secured thereto so that the balls are retracted when the retracting device is moved. In one version, the retractor consists of a slide engaged in a slot in the handle. In another version the retractor is a reel journaled in the handle with a tensioning spring and a releasable clutch to hold the reel in a tensioned position.

---

This invention relates to whirling-whistling toys, of the type involving centrifugal balls on cords secured to a handle.

The primary object of the invention is the provision of devices of the kind indicated, wherein, as the handle is manually rotated, the balls centrifugally separate and swing around the handle, and in so doing pull out of the handle, the cords being adapted to be pulled into the handle, either manually or mechanically, after use of the toys, whereby the cords and the balls are retracted to compact stored positions, on the handle, instead of being loose and dangling.

Another object of the invention is the provision of devices of the character indicated above, which are adapted to be made in attractive forms and colors, entirely of inexpensive plastic material, except for a spring, in the case of the mechanically operated embodiment.

In the drawings:

FIGURE 1 is a side elevation of one form of device of the present invention, showing the balls, and the cords, shown in phantom lines, in stored positions on the handle;

FIGURE 2 is a perspective view, on a reduced scale, showing the device in action;

FIGURE 3 is a horizontal section, taken on the line 3—3 of FIGURE 1;

FIGURE 4 is a top plan view of another form of toy of the invention, showing the balls in retracted positions;

FIGURE 5 is a vertical transverse section, taken on the line 5—5 of FIGURE 4; and, FIGURE 6 is a transverse section, taken on the line 6—6 of FIGURE 5.

Referring in detail to the drawings, the devices of FIGURES 1 to 3 comprises a vertically elongated hollow handle 10, preferably of upwardly flaring cylindrical cross section, and having a side wall 12, a bottom wall 14, and a top wall 16. The top wall 16 is of concavo-convex cross section, and is formed with a central opening, in which a grommet 20 is secured. The handle side wall 12 is formed with a vertical slot 22, in which a circular flange slide 24 is confined.

The middle part of a cord 64, having equal length flights 65, is secured to the slide 24, within the handle 10, and the flights are passed up through the grommet 20. Similar balls 62 are secured on the outer ends of the cord flights 65.

To use the toy of FIGURES 1 to 3, the slide 24 is pushed upwardly in the slot 22, so as to enable the flights 65 to pass upwardly through the grommet and free the balls 62 to move apart centrifugally and swing around the handle 10, as the handle is held in the hand and rotated or oscillated about its vertical axis. After use of the toy, in this manner, the slide 24 is moved down along the slot 22, so as to retract the cord flights into the handle and place the balls 62 in the seat afforded by the concavity of the handle top wall 16.

The form of toy shown in FIGURES 4 to 6, comprises a hollow spherical handle 10a, having a top wall 16a, the side wall 12a of the handle being formed with diametrically aligned and opposed tubular bosses 26 and 28. The boss 26 is substantially longer than the boss 28. The boss 26 has an axial bore 30, which, at its outer end, opens through the side wall 12a, as indicated at 32a. A spindle 34 is rotatably and slidably engaged in the bore 30 and has an outer end 36 which normally projects from the handle. The boss 28 has a hexagonal bore 38, in which is slidably but non-rotatably engaged a hexagonal stud 40. A coil spring 42 is compressed in the bore 38 between the handle side wall 12a and the outer end of the stud 40.

The stud 40 has a clutch head 4, on its inner end, having circumferentially spaced teeth 46 which are arranged to normally engage in circumferentially spaced slots 48, in the adjacent side of a cord drum 50, which is journalled on the spindle 34. The drum 50 is formed with an axial cylindrical recess 52, in the side thereof remote from the clutch head 44, in which a flat spiral spring 54 is confined.

The spring 54 has an inner end fixed, as indicated at 56, to the boss 26, and an outer end, fixed, as indicated at 58, to the wall of the recess 52. The drum 50 is formed with a shallow peripheral groove 60.

A pair of similar balls 62a is provided, to which are suitably secured a cord 64a, having flights 65a, which pass down through a grommet 20a, in the handle top wall 16a, and are suitably connected, at their inner or lower ends and wound around the groove 60 of the drum 50.

When the spring 54 is wound up or tensioned, by the rotation of the drum produced by centrifugal separation of the balls 62a, as the handle 10a is rotated or oscillated, this separation being permitted by the accompanying upward movement of the cord flights 65a, and the balls reach a separated relationship, the clutch head prevents retrograde rotation of the drum, so that the spring is kept under tension.

When it is desired to retract the balls and the cord flights to storage position in and on the handle 10a, the spindle 34 is pushed inwardly, against the resistance of the coil spring 42, so that the drum can rotate relative to the clutch head 44, and the spiral spring 54 is freed to turn the drum in a direction to wind the cord thereon. The cord flights are thereby drawn into the handle 10 and the balls 62a thereby drawn on to the top wall 16a of the handle 10a.

The balls 62 and 62a may be provided with holes 66 and 66a, respectively, therearound which are adapted to catch air, as the balls are whirled around the handle 10, so as to produce a whistling sound.

What is claimed is:

1. A toy, comprising a hollow handle having a top wall and a side wall, said top wall being formed with opening means, a cord having equal length flights passed through said opening means, said flights having outer ends and inner ends, balls secured to said outer ends, rigid retracting means movably-mounted on the handle, and means securing the inner ends of the cord flights to said retracting means, wherein the handle side wall is formed with a longitudinal slot, said retracting means comprising a slide confined in said slot, said cord flights being secured to the slide.

2. The device of claim 1, wherein the balls are formed with radial air trapping holes adapted to produce whistling sounds as the balls are rotated around the handle.

3. The device of claim 1, wherein the handle top wall has a concave upper surface in which the retracted balls are adapted to seat, the slide being moved away from the top wall to complete and maintain retraction of the cord flights and hold the balls seated on the handle top wall.

4. A toy comprising a hollow handle having a top wall and a side wall, said top wall being formed with opening means, a cord having equal length flights passed through said opening means, said flights having outer ends and inner ends, balls secured to said outer ends, rigid retracting means movably-mounted on the handle, and means securing the inner ends of the cord flights to said retracting means, wherein said retracting means is externally mounted on the handle, a spring rotated drum journalled within the handle, said cord flights being wound around the drum, clutch means acting between the handle and the drum and normally precluding rotation of the drum in a retrograde direction, and manual means associated with said clutch means for disengaging the clutch means from the drum to permit rotation of the drum in a direction to pull the cord flights into and retract the balls on to the top wall of the handle, the cord flights being pulled out of the handle and the handle oscillated to produce centrifugal separation of the balls and tensioning of the spring drum.

5. A toy comprising a hollow handle having a top wall and a side wall, said top wall being formed with opening means, a cord having equal length flights passed through said opening means, said flights having outer ends and inner ends, balls secured to said outer ends, rigid retracting means movably-mounted on the handle, and means securing the inner ends of the cord flights to said retracting means, wherein said retracting means is externally mounted on the handle, the side wall of the handle being formed with first and second tubular bosses, the bosses being aligned with each other, the first boss having a cylindrical bore opening through the side wall, the second boss having a polygonal bore, a spindle slidably and rotatably engaged in the cylindrical bore of the first boss, said drum being journalled on the spindle, a spiral spring having an outer end secured to the drum and an inner end secured to the first boss, a polygonal stud slidably and non-rotatably engaged in the polygonal bore of the second boss, spring means compressed between the handle side wall and the outer end of the stud, said stud having a clutch head on its inner end, clutch teeth on the clutch head, said drum having detent means with which said teeth are normally engaged, said spindle being pushed inwardly against the resistance of said spring means for releasing the clutch teeth from the detent means on the drum.

References Cited

UNITED STATES PATENTS

| | | | |
|---|---|---|---|
| 610,600 | 9/1898 | Davis | 46—52 |
| 2,547,776 | 4/1951 | Rankin | 46—51 X |
| 2,958,156 | 11/1960 | Schmahl et al. | 46—51 |

ROBERT PESCHOCK, Primary Examiner

R. F. CUTTING, Assistant Examiner

U.S. Cl. X.R.

46—59